United States Patent
Waghmare et al.

(10) Patent No.: US 10,899,386 B2
(45) Date of Patent: Jan. 26, 2021

(54) FRONT RAIL TO IMPROVE EARLY ENERGY ABSORPTION

(71) Applicants: Sunil Waghmare, Rochester Hills, MI (US); Abhijeet Thorat, Troy, MI (US); Meenakshi Solaimalai, Auburn Hills, MI (US)

(72) Inventors: Sunil Waghmare, Rochester Hills, MI (US); Abhijeet Thorat, Troy, MI (US); Meenakshi Solaimalai, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 79 days.

(21) Appl. No.: 16/413,019

(22) Filed: May 15, 2019

(65) Prior Publication Data
US 2020/0361533 A1 Nov. 19, 2020

(51) Int. Cl.
*B62D 21/02* (2006.01)
*B62D 21/15* (2006.01)

(52) U.S. Cl.
CPC .......... *B62D 21/02* (2013.01); *B62D 21/152* (2013.01)

(58) Field of Classification Search
CPC .............................. B62D 21/02; B62D 21/152
USPC .................................................. 296/189.09
See application file for complete search history.

(56) References Cited

U.S. PATENT DOCUMENTS

| | | | | |
|---|---|---|---|---|
| 6,179,353 B1* | 1/2001 | Heatherington | ........ | B60R 19/18 293/120 |
| 6,679,546 B2* | 1/2004 | Mishima | ................ | B62D 25/06 296/203.01 |
| 7,273,247 B2* | 9/2007 | Grueneklee | ............ | B62D 21/07 296/204 |
| 8,256,831 B2* | 9/2012 | Abe | ..................... | B62D 25/082 296/203.02 |
| 9,701,344 B2* | 7/2017 | Kodama | ............... | B62D 21/152 |
| 9,738,320 B2* | 8/2017 | Miyamoto | ............. | B60R 19/26 |
| 9,981,694 B2* | 5/2018 | Sekiguchi | ............... | B60R 19/18 |
| 10,661,834 B2* | 5/2020 | Legray | ..................... | B60R 19/04 |
| 2003/0072900 A1* | 4/2003 | Niikura | ................ | B62D 21/152 428/34.1 |
| 2009/0309349 A1* | 12/2009 | Yamanami | ............ | B62D 21/152 280/830 |
| 2011/0083923 A1* | 4/2011 | Ajisaka | ................ | B62D 21/152 180/291 |
| 2012/0175897 A1 | 7/2012 | Rawlinson et al. | | |
| 2012/0248820 A1* | 10/2012 | Yasui | ..................... | B60R 19/34 296/187.09 |
| 2013/0256051 A1* | 10/2013 | Nakamura | ........... | B62D 21/155 180/271 |
| 2013/0320709 A1* | 12/2013 | Kuwabara | ............ | B62D 25/082 296/187.09 |
| 2015/0001894 A1* | 1/2015 | Outen | .................... | B62D 21/02 296/204 |
| 2020/0180699 A1* | 6/2020 | Hirose | .................. | B62D 21/15 |

* cited by examiner

*Primary Examiner* — Pinel E Romain
(74) *Attorney, Agent, or Firm* — Ralph E Smith

(57) ABSTRACT

A vehicle front rail has an elongated body with a first end adapted to couple with a bumper and a second end adapted to couple with a rocker panel. A portion of the body, adjacent the first end, has a cross section with an overall dumbbell shape. It includes a first and second portion separated by a narrow portion. A reinforcement member is positioned in the narrowed portion of the dumbbell cross section.

16 Claims, 3 Drawing Sheets

FRONT RAIL TO IMPROVE EARLY ENERGY ABSORPTION

FIELD

The present disclosure relates to vehicles and, more particularly, to a front rail that improves early energy absorption.

BACKGROUND

In automotive vehicles, it is desirable to keep the occupants of the vehicle safe. This is accomplished in various ways by various apparatus. One type of apparatus is the front structure of the vehicle absorbing energy of an object contacting it. Thus, the energy is absorbed by the front structure and is significantly reduced or eliminated before being passed on to the occupants. While various types of apparatus are available, and while they work satisfactory for their intended purpose, designers strive to improve the art.

Thus, it is desirable to provide a front structure to improve early energy absorption. Also, it is desirable for the front structure to improve a deceleration response in a frontal impact mode. It is desirable to have a front rail with a collapse force of 150 KN. The front rail tip section and inside should achieve the 150 KN force for 10 m/s during frontal impact mode. This improves early deceleration levels and reduces peak pulse during impact mode.

SUMMARY

Accordingly, it is an object of the present disclosure to provide a front rail for a vehicle. The front rail comprises an elongated body with a first end and a second end. The first end is adapted to couple with a bumper. The second end is adapted to coupled with a rocker panel. A portion of the body adjacent the first end has a cross section with an overall dumbbell shape. It includes a first and second portion separated by a narrowed portion. A reinforcement member is positioned in the narrowed portion of the dumbbell cross section. The first and second portions, in cross section, have an overall rectangular shape. The rectangular shapes may be of different sizes. The reinforcement has a flattened Z shape, in cross section. The web is substantially perpendicular to its legs. The web may be flattened and planar or tortuous in cross section. The front rail body includes two stamped pieces secured together.

According to an additional embodiment, a vehicle including a frame comprises the frame having a pair of front rails. Each front rail comprises an elongated body with a first end and a second end. The first end is adapted to couple with a bumper. The second end is adapted to coupled with a rocker panel. A portion of the body adjacent the first end has a cross section with an overall dumbbell shape. It includes a first and second portion separated by a narrowed portion. A reinforcement member is positioned in the narrowed portion of the dumbbell cross section. The first and second portions, in cross section, have an overall rectangular shape. The rectangular shapes may be of different sizes. The reinforcement has a flattened Z shape, in cross section. The web is substantially perpendicular to its legs. The web may be flattened and planar or tortuous in cross section. The front rail body includes two stamped pieces secured together.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
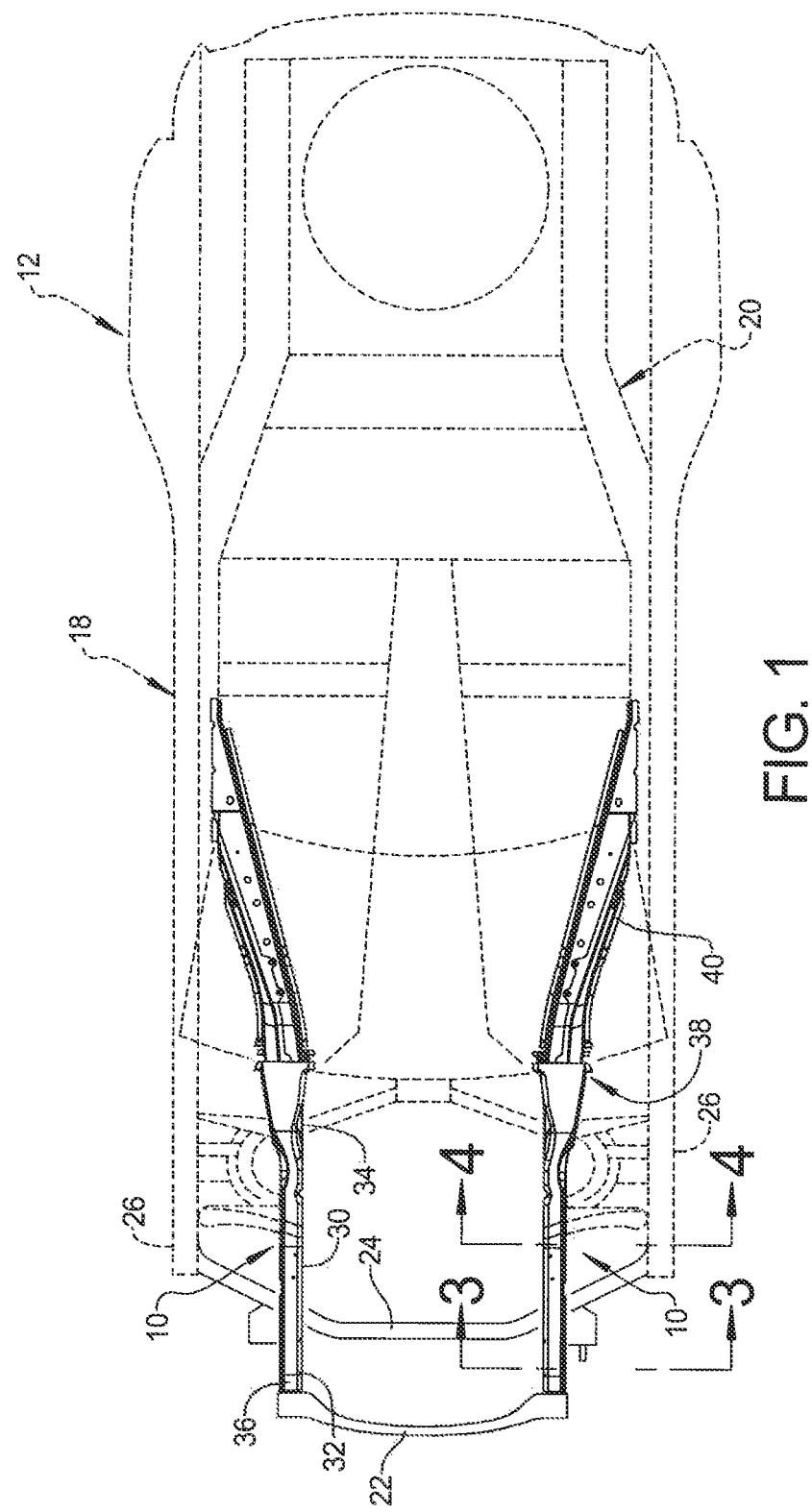
FIG. 1 is a bottom plan view of a vehicle including the front rails.
Figure 2:
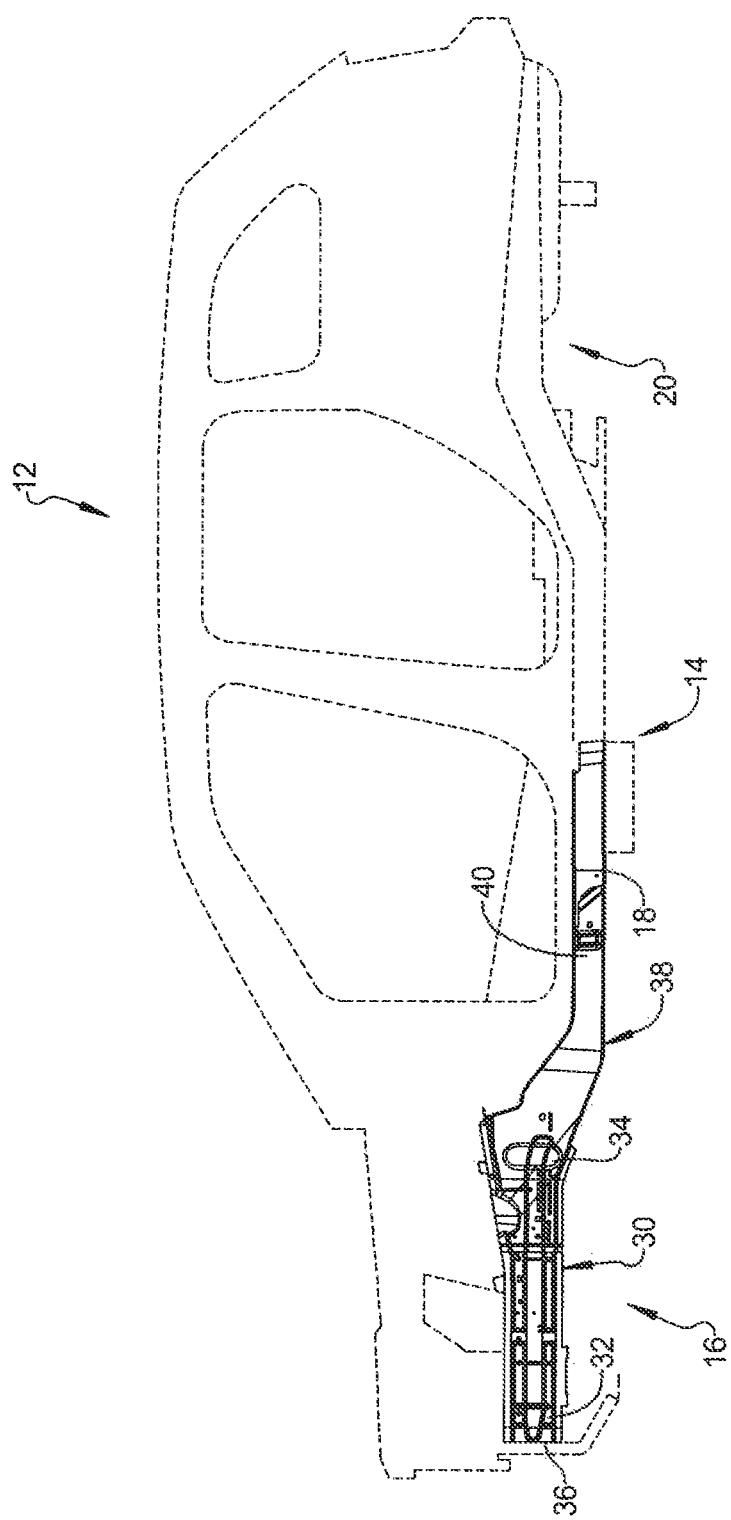
FIG. 2 is a side elevation view of FIG. 1.

Turning to the figures, a front rail for a vehicle is illustrated and designated with the reference numeral 10. A vehicle 12 generally includes a unibody frame 14 that includes a front section 16, rocker panels 18 and a rear section 20. The front section 16 generally includes a left and right front rail 10. Also, the front section 16 includes a bumper 22 attached at a first end of the rails 10. The second end of the rails is attached to the rocker panel 18. A secondary bumper 24 is attached to subframe members 26. The subframe members 26 are, in turn, coupled with the rocker panels 18.

The front rails 10 include the same parts and are isomers of one another. Thus, only one rail 10 will be discussed with reference to both. The front rail 10 includes an elongated body 30. The body includes a first end 32 and a second end 34, The first end 32 is connected with the bumper 22. Generally, a crush can 36 is positioned between the bumper and the front rail 10.

The second end 34 of the body 30 is coupled with a torque box 38. The torque box 38 is generally welded with the second end 34 of the body 30. The torque box 38 includes an extension 40 to connect with the rocker panel 14.

The elongated body 30 includes a reinforcement member 42 positioned in the hollow body 30. The elongated body 30 is illustrated in cross-section in FIGS. 3 and 4. The body has an overall barbell shape. It includes a first head portion 44, a second head portion 46 with a narrowed portion 48 between the head portions 44, 46. The head portions 44, 46 have an overall rectangular shape in cross section. Generally, the rectangular head portions 44, 46 have different sizes. However, they could have the same size. Each rectangular shaped head portion 44, 46 includes four corners. Thus, the dumbbell shape provides eight corners that increase the higher force average of the rail.

The narrow section 48 includes the reinforcement member 42. The reinforcement member is generally welded or the like to the narrowed portion 48. It is welded on each side to provide two more corners to increase the average rail force.

Figure 3:
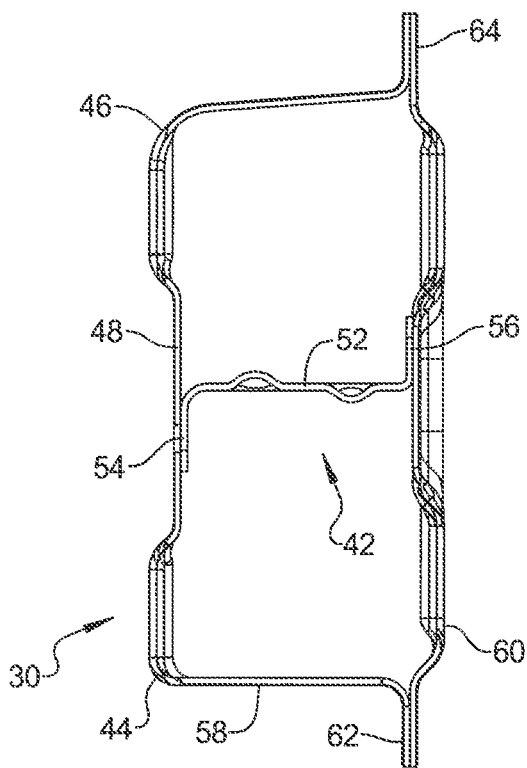
FIG. 3 is a cross section view of the rail along line 3-3 thereof.
Figure 4:
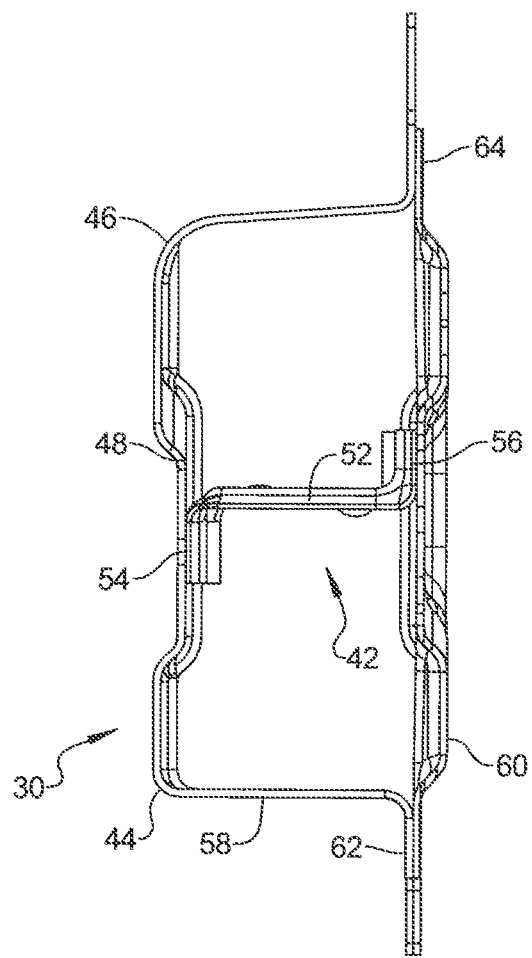
FIG. 4 is a cross section view of the rail along line 4-4 thereof.

The reinforcement member has an overall Z shape. The Z shape is flattened and includes a web 52 and legs 54, 56. The web 52 is substantially perpendicular to the legs 54, 56. The web 52 may have a tortuous, in cross section, as illustrated in FIG. 3. Additionally, the web 52 can have a flat and planar configuration, in cross section, as illustrated in FIG. 4. The reinforcement member 42 generally extends the entire length of the body 30.

The rail 10 generally includes two stamped sheets 56, 58. The sheets 56, 58 are formed into a desired configuration and are attached to one another generally, via welding along the flanges 60, 62. Thus, this provides a hollow rail 10 with an average force transfer by the rail tip for 300 mm crush at 152 KN. Thus, this increases the average force by almost a factor of two with respect to current designs. The present rail 10 provides a rail front tip capacity of 152 KN for 10 mm second window.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A front rail for a vehicle comprising:
   an elongated body having a first end adapted to couple with a bumper and a second end adapted to couple with a rocker panel;
   a portion of the elongated body adjacent the first end has a cross section with an overall dumbbell shape that includes a first and second portion separated by a narrowed portion; and
   a reinforcement member positioned in the narrowed portion of the dumbbell cross section.

2. The front rail for a vehicle of claim 1, wherein the first and second portions of the dumbbell have a rectangular shape in cross section.

3. The front rail for a vehicle of claim 2, wherein the rectangular shapes are of different sizes.

4. The front rail for a vehicle of claim 1, wherein the reinforcement has a flattened Z shape in cross section.

5. The front rail for a vehicle of claim 4, wherein a web of the Z shape is substantially perpendicular to legs of the Z shape.

6. The front rail for a vehicle of claim 5, wherein the web, in cross section, has a flat and planar configuration.

7. The front rail for a vehicle of claim 5, wherein the web, in cross section, has a tortuous configuration.

8. A front rail for a vehicle of claim 1, wherein the front rail body includes two stamped pieces secured together.

9. A vehicle including a frame comprising:
   the frame having a pair of front rails, each front rail comprising:
   an elongated body having a first end adapted to couple with a bumper and a second end adapted to couple with a rocker panel;
   a portion of the elongated body adjacent the first end has a cross section with an overall dumbbell shape that includes a first and second portion separated by a narrow portion; and
   a reinforcement member positioned in the narrowed portion of the dumbbell cross section.

10. The vehicle including a frame of claim 9, wherein the first and second portions of the dumbbell have a rectangular shape in cross section.

11. The vehicle including a frame of claim 10, wherein the rectangular shapes are of different sizes.

12. The vehicle including a frame of claim 9, wherein the reinforcement has a flattened Z shape in cross section.

13. The vehicle including a frame of claim 12, wherein a web of the Z shape is substantially perpendicular to legs of the Z shape.

14. The vehicle including a frame of claim 13, wherein the web, in cross section, has a flat and planar configuration.

15. The vehicle including a frame of claim 13, wherein the web, in cross section, has a tortuous configuration.

16. The vehicle including a frame of claim 9, wherein the front rail body includes two stamped pieces secured together.

* * * * *